June 16, 1964  W. B. SILKER  3,137,634
NUCLEAR REACTOR OPERATION
Filed Aug. 30, 1963   2 Sheets-Sheet 2
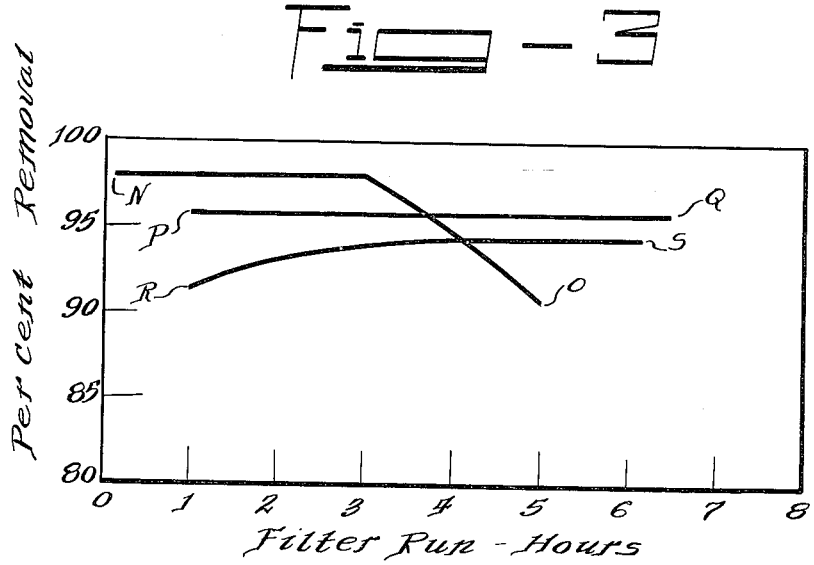
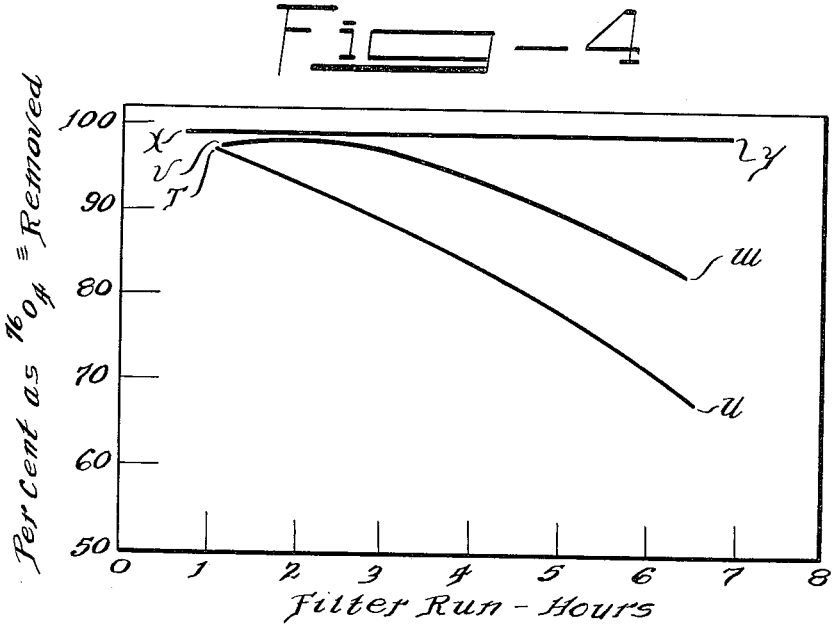
INVENTOR.
Wyatt B. Silker
BY
Roland A. Anderson
Attorney

United States Patent Office 3,137,634
Patented June 16, 1964

3,137,634
NUCLEAR REACTOR OPERATION
Wyatt B. Silker, Kennewick, Wash., assignor to the United States of America as represented by the United States Atomic Energy Commission
Filed Aug. 30, 1963, Ser. No. 305,901
10 Claims. (Cl. 176—39)

The invention relates to an improved method of operating nuclear reactors, more particularly to a method of reducing the radioisotopic content of the effluent coolant water resulting from the operation of such reactors.

The presence of radioisotopes in the effluent coolant waters from nuclear reactors has long been a problem. While present only in "trace" amounts and hence insignificant from the standpoint of conventional chemistry, their radioactivity makes them a highly significant public health problem. Even when the concentration of a radioisotope in water is on a sufficiently low level that the water may be safely ingested, a danger remains that certain fish or other fauna, and flora will selectively concentrate the isotope and thereby build up radioactivity to an unsafe level when these are used for food.

Various proposals have been advanced to reduce the radioisotopes present in effluent waters, all of them quite expensive to carry out because of the vast quantities of water to be treated, and the extremely small concentrations of the radioisotopes. Theoretically, radioisotopes could be eliminated by running effluent waters through beds of ion exchange resin, but the cost of this is prohibitive.

It is, accordingly, the general object of the invention to provide an improvement in the method of operating nuclear reactors whereby the concentrations of radioisotopes in their effluent waters will be substantially reduced.

Other objects will appear as the description proceeds.

Reasoning that the presence of radioisotopes in effluent reactor waters is due to precursor isotopes in incoming waters which are transmuted within reactors to radioisotopes, I have found that methods already in existence for treating incoming waters in order to remove particulate matter may be modified so that the precursor isotopes, even though in the dissolved state rather than particulate, may be removed as well. This has the advantage of requiring no investment for additional equipment, as would be the case if the effluent water were to be treated, but only modification of the manner in which this equipment is used, as will now be explained.

Attention is now directed to the drawings, FIG. 1 of which is a graph in which the percentages of isotope removal are plotted as ordinates against pH of a water in question as abscissae.

FIG. 3 is a graph in which percentages of radioarsenate removed from water are plotted as ordinates against hours of filter runs as abscissae.

FIG. 4 is a graph in which percentages of radioarsenate ion removed from water are plotted against filter runs as abscissae.

Figure 1:
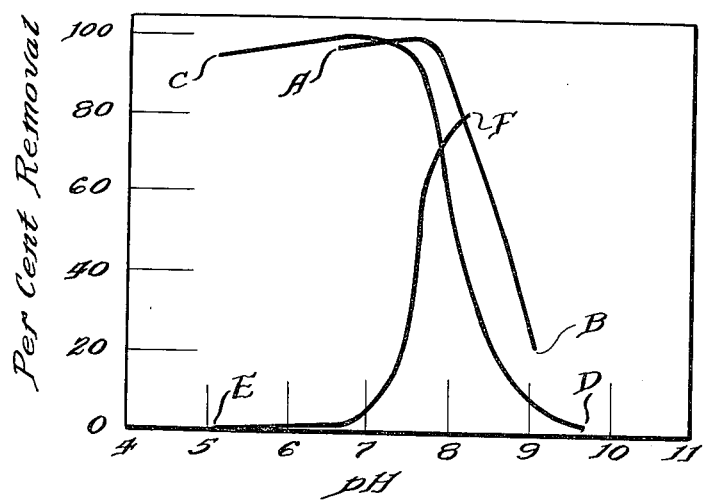

Continuing along the line of reasoning just mentioned, I found by means of activation analysis that incoming water contains a large, and constantly changing, variety of isotopes capable of being converted into radioisotopes within a nuclear reactor, which at first view appeared to cast discouragement on my concept of treating the incoming water, since it appeared much simpler to treat the effluent water where only a limited number of radioisotopes were known to emerge. However, it was then reasoned that only a limited number of incoming isotopes underwent transmutation in appreciable amounts within a reactor because they are the only ones which were delayed for a sufficient length of time for this to happen, the other possible precursors passing through at the same rate as the coolant water itself, and hence not affected to any significant extent by the radiation flux. An explanation for this possible difference in time was that the aluminum coolant tubes attracted certain isotopes and not others, and those which they attracted were held sufficiently long for neutron bombardment to bring about appreciable transmutation into radioisotopes. Aluminum coolant tubes have a corrosion film which is mainly hydrated aluminum oxide, in some cases with minor amounts of the oxides and hydroxides of iron and other metals; this film has great chemical similarity to the hydrated aluminum oxides used for flocculants in conventional water treatment systems for the removal of particulate matter. In view of this, I conducted three series of laboratory experiments to determine whether, by increasing the amount of hydrated aluminum oxide floc beyond that needed to remove particulate matter, this would result in the removal of precursor isotopes that undergo transmutation into radioisotopes within reactors.

The two most troublesome radioisotopes emerging in the effluent from the reactors with which I was concerned were $P^{32}$ and $As^{76}$, the first of which accumulates in whitefish. My reasoning was that these are formed in reactors from stable precursor isotopes by the following neutron reactions:

$$P^{31} + {}_0n^1 \rightarrow P^{32}$$
$$As^{75} + {}_0n^1 \rightarrow As^{76}$$

In addition, a fast neutron can form $P^{32}$ from the stable precursor isotope $S^{32}$:

$$S^{32} + {}_0n^1 \rightarrow P^{32} + {}_1H^1$$

The last reaction appears to be especially important in cases where sulfuric acid is used to acidify coolant water.

In addition to $P^{32}$ and $As^{76}$, other radioisotopes in effluent water, though of less importance, are $Zn^{65}$, $Cu^{64}$, and $Cr^{51}$, which could be formed by transmutation reactions similar to those set forth above. $Zn^{65}$, whose precursor isotope is $Zn^{64}$, is especially undesirable where the effluent water drain into the sea since it is selectively accumulated by oysters. When uranium is present in the incoming water, its 238 isotope is a precursor of $Np^{239}$, and its 235 isotope is the precursor of a broad spectrum of fission products, which accounts for the presence of radioactive rare earths in effluent waters.

The three series of laboratory experiments above referred to appeared to confirm my reasoning in a general way. In the first series incoming water from a river, having a solids content of between zero and ten p.p.m. and a pH of about 7.0 was spiked with trace amounts of radioactive arsenate ion containing $As^{76}$, a radioactive phosphate ion containing $P^{32}$ and radioactive zinc cation contain $Zn^{65}$. While the ultimate object of the investigation was not to remove these radioactive species, but rather their stable precursors $As^{75}$, $P^{31}$ and $Zn^{64}$ from incoming water, it was more convenient to work with the radioisotopes rather than with the precursors. Chemically the reactions of the precursors and of their transmutation products are identical, and the latter are easily identified qualitatively and quantitatively by radioactive counting methods, whereas for the stable precursors expensive and cumbersome activation analysis would have been required.

The spiked water was counted in a scintillation counter to determine its radioactivity due to the three radioisotopes mentioned, and then divided into portions and the pH of the portions was adjusted individually upward and downward with either NaOH, $H_2SO_4$ or $HNO_3$ from about 5 to about 10. To the portions then, in turn, were added 30–40 p.p.m. of aluminum nitrate nonohydrate ($Al(NO_3)_3 \cdot 9H_2O$, or ANN); this, on contact with the water of the portions, hydrolyzed to form precipitates of hydrated alumina (AlO(OH)), or some similar species, depending to some extent on the pH of the particular portion. Precipitates, or flocs, of this type, which could have been made by other hydrolyzable flocculants such as alum, aluminum sulfate and the like all serve the same purpose in water treatment, of spreading throughout the aqueous medium and entrapping the particulate matter therein, and then either settling to the bottom of the containing vessel from which the supernatant water can be siphoned off, or else the precipitate, or "floc" as it is generally called, may be removed from the water by filtration, or by a combination of these. In the three series of laboratory experiments now being described the flocculant was stirred magnetically for five minutes and the resulting floc was removed by membrane filters.

The filtrate water from each portion was then counted for radioactivity attributable to $As^{76}$, $P^{32}$ and $Zn^{65}$ in the same manner as the untreated water initially, and the percentages of isotope removal were then computed and plotted as ordinates against pH as abscissae in the graph of FIG. 1. In the graph the topmost curve on the right, or curve AB, relates to the percentages of $P^{32}$ removed; the curve just below it, CD, relates to the percentages of $As^{76}$ removed; and the lowest curve, EF, relates to the percentages of $Zn^{65}$ removed.

In the second series of laboratory experiments, the same spiked water was counted for radioactivity and divided into portions as in the first series. In this series the pH was permitted to remain at its original level of 7.0 in all cases, but the amount of flocculant, in this series $Al(NO_3)_3 \cdot 17H_2O$, was added to the portions in varying amounts, from about 5 to about 58 p.p.m. The stirring, filtration, counting and computation procedures of the first series were then carried out.

Figure 2:
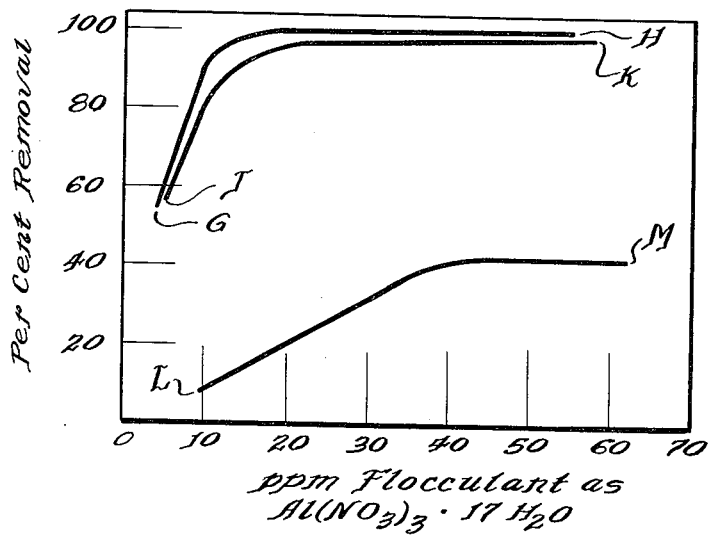
FIG. 2 is a graph in which percentages of removal of radioisotopes are plotted as ordinates against p.p.m. of flocculant added to water as abscissae.

FIG. 2 is a graph in which percentages of removal of radioisotopes are plotted as ordinates against p.p.m. of flocculant added as abscissae. The topmost curve, GH, relates to the percentages of $As^{76}$ removed; the curve just below it, JK, relates to the same for $P^{32}$; and the bottom curve, LM, relates to the same for $Zn^{65}$.

In the third series of experiments the procedures of the first two series were repeated except that the pH and p.p.m. of flocculant added were kept constant at 7.0 and 20 respectively for all portions and the floc was allowed to stand after stirring for varying times between zero and two hours. No detectable differences in the removal of any of the three radioisotopes were noted between any of the portions.

From the three series of laboratory experiments, it was found that precursor isotopes could be removed by using comparatively large amounts of aluminum containing flocculants in excess of the amounts required to remove particulate matter from the water in question, which required about 5 p.p.m. It was discovered that if the pH were left unchanged, close to 100 percent removal of $As^{76}$ as arsenate ion could be removed by adding about 20 p.p.m. of aluminum containing flocculant and somewhat more flocculant, in the vicinity of 30 p.p.m., would result in maximum removal of $P^{32}$ as phosphate ion, the maximum being slightly lower than the maximum removal of $As^{76}$.

As FIG. 2 shows, the maximum removal of $Zn^{65}$ at the unchanged pH level of 7.0 is only about 40 percent, regardless of the amount of flocculant used. However, as FIG. 1 suggests, this maximum can be raised to twice or more the value mentioned simply by raising the pH to about 8. At this pH, to be sure, the removal of $As^{76}$ and $P^{32}$ begins to decline steeply, so that the procedure suggested, if removal of all three isotopes were required, would be to add flocculant at a pH of 7 and separate the resulting floc from the water, thereby removing the $As^{76}$, $P^{32}$, and about 40 percent of the $Zn^{65}$, and then acidify the water to about pH 8 and add a second charge of flocculant and the second resulting floc will then entrap most if not all the remaining $Zn^{65}$. It will be understood that in the foregoing explanation the references to $As^{76}$, $P^{32}$ and $Zn^{65}$ are equally applicable to their stable precursor isotopes, whose elimination from incoming water, as already explained, was the actual object of the experiments.

When it was attempted to apply the findings from the series of laboratory experiments just described to a scale model of a water treatment system of pilot plant size and to an actual water treatment system, operable results were obtained but a serious practical difficulty arose when membrane filters were not used. Membrane filters, such as were used in the laboratory experiments, are not generally considered practical for large or even pilot plant scale water treatment, and the combination sand and coal filters used in connection with the nuclear reactors sometimes permitted precursor isotopes to pass through, even when the amount of flocculant added to the incoming water exceeded the customary 5 p.p.m. usually added to remove particulate matter.

The new type of combination sand and coal filters used in the scale or pilot plant model and in the actual water treatment plants differs from conventional filters. Unlike the latter which have a thick layer of fine sand of about 0.3 to about 0.4 mm. particle size and above it a thinner layer of broken-up coal of about 0.7 to about 0.8 particle size, or "anthrafilt," the new type filters have a top layer of anthrafilt which is the thicker of the two layers, at least four times and preferably nine times as thick as the sand layer just beneath it. As in the case of conventional filters, a layer of gravel or other coarse material is beneath the layer of sand to support it. This newer type of filter depends for its effectiveness on certain polyelectrolyte materials known as "filter aids"; these are colloidal organic substances of high molecular weight, bearing numerous hydroxyl, amine, carboxyl, amide or other water-compatible, colloidally active functional groups, or a combination of these. Included in the class are polysaccharides, polyacrylamides, polyacrylamide hydrolytes, carboxymethylcellulose, alginates, carrageenins and guar gum. These are injected directly into the water entering a newer type of filter as above described, at the rate of from about 0.002 p.p.m. to about 0.01 p.p.m. It is believed that these agents form a very thin layer, possibly monomolecular, over the particles of the anthrafilt and thus improve the efficiency of the filter. Filters of the newer type so treated can filter water at a faster rate than conventional filters, and need to be backwashed less frequently.

In order to find the cause of the practical difficulties above mentioned, the same water used in the laboratory tests was spiked with a trace amount of $As^{76}$ in the form of arsenate ion, counted for radioactivity and run through scale model water treatment plant in three runs; in the first run ANN was used as a flocculant at the rate of 25 p.p.m.; in the second run at the rate of 20 p.p.m.; and in the third run at 15 p.p.m., the pH being unchanged from the initial value in all runs, or 7.0. The effluent water from the filter was monitored continuously for radioactivity. The results of such monitoring in counts per minute were compared with the radioactivity of the initial counting and computations were made to determine the percentages of radioisotope removal that was taking place as time progressed. The results are set forth in the graph of FIG. 3 in which percentages of radioarsenate removed for the various runs are plotted as ordinates against hours of the filter run as abscissae.

In the graph of FIG. 3 the curve NO relates to the first run, the curve PQ to the second run and the curve RS to the third run. Curiously, this shows that while 25 p.p.m. of flocculant initially produces the best results, these are comparatively short-lived and after about three hours a marked decline in efficiency takes place. Flocculant at the rate of 20 p.p.m. results in a steady removal of the radioisotope to the extent of about 95 percent for more than six hours, and 15 p.p.m., while starting off at around 90 percent removal, gradually improves to about 93 percent after about four hours and thereafter remains constant for at least two more hours.

Similar tests, under the same conditions, with radio-arsenate ion and with $P^{32}$ as radiophosphate ion gave similar results to those shown in FIG. 3. Table I shows the data with respect to $P^{32}O_4$ ion removal.

*Table I*

EFFECT OF $Al(NO_3)_3 \cdot 9H_2O$ CONCENTRATION ON PHOSPHATE REMOVAL

| $Al(NO_3)_3 \cdot 9H_2O$: | Percent $P^{32}O_4$ removal |
|---|---|
| 10 | 95.5 |
| 15 | 92.8 |
| 20 | 97.1 |
| 26 | 92.1 |

The next investigation was to determine whether the situation could be improved by means of the polyelectrolyte filter aids. The same spiked water was run through the scale model plant in three runs, all using 20 p.p.m. of ANN as the flocculant, all at the same pH of 7.0, but differing as to the injection of polyelectrolyte into the filter influent. In the first run no polyelectrolyte was injected; in the second run 0.01 p.p.m. of polyelectrolyte was injected, and in the third run 0.02 p.p.m. The effluent from the filter was monitored as before and the percent of radioarsenate computed.

FIG. 4 is a graph showing the results of these computations in which percentages of radioarsenate ion removal are plotted against filter run in hours as abscissae. The bottom curve TU shows results of the first run, the middle curve VW those of the second run and the top curve XY those of the third run.

It can be readily seen that injection into the filter influent of 0.02 p.p.m. of polyelectrolyte, or about twice the maximum amount required for the removal of particulate matter, brings about greatly improved results with respect to the retention by the filter of dissolved precursors of radioisotopes from the effluent. This constitutes the second improved embodiment of the invention.

EXAMPLES I AND II

Two large scale nuclear reactors with their water treatment plants, known as reactor B and reactor H, were used in the examples. The water in both plants had a solids content of between zero and ten p.p.m., and a pH of about 7.0. The water treatment plants of both reactors were subdivided into two halves, making it possible to treat the water entering different sides of the reactor in a different manner; since the water passed through the reactors through a multiplicity of separate coolant tubes only a very limited amount of mixing took place within the reactor between the water coming from the different halves of the water treatment plants, and hence the effluent from the two sides of the reactors could be monitored separately for radioactivity.

In the case of both reactors one-half of the water treatment plant was operated in the conventional manner for the removal of particulate matter, and this half, together with the side of the respective reactor which is supplied with coolant water will be referred to as the "control" side, or "far" side, of the reactor. In the case of both reactors the incoming waters on this side were treated with from 3 to 5 p.p.m. of alum as flocculant, the resulting floc was permitted to settle in settling basins, and after settling the supernatant water was siphoned off and led through a filter of the newer type above described, and thence through the control side of the reactor. Just before entering the filter the water was injected with about 0.01 p.p.m. of Separan, a polyelectrolyte consisting of a high molecular weight polyacrylamide hydrolyzed to an extent sufficient to replace from about 0.8% to 10% of the amide groups with carboxyl groups, a 0.5% by weight aqueous solution of which has a viscosity of about 4 centipoises.

The other sides of the reactors, together with their respective coolant supplying plants, will be referred to as the "test" sides, or "near" sides. The coolant waters used on these sides, of both the B and H reactors, were treated in a nonconventional manner, varying somewhat from time to time within the scope of the invention, as will be explained in detail below.

The effluent waters from all four sides, namely, the far and near sides of the B and H reactors, were monitored for radioisotopes $P^{32}$, $As^{76}$, $Zn^{65}$, $Np^{239}$ and also for $Cu^{64}$ and $Cr^{51}$.

In the case of the B reactor, coolant water fed to the near, or test, side of the reactor was treated with 18–20 p.p.m. of alum as flocculant, except during the period of November 1–11 when 11 p.p.m. of alum was used. Prior to October 17, difficulties were experienced in obtaining representative samples of effluent, but thereafter difficulties became less. A filter cycle with 0.008 to 0.015 p.p.m. feed of Separan was maintained and a pH of 6.9 was maintained with additions of $H_2SO_4$. Table II gives the results in terms of relative concentrations from monitoring of the rear (N) and far (F) side effluent waters of the B reactor.

*Table II*

RELATIVE RADIOISOTOPE CONCENTRATION IN B AREA, NEAR- AND FAR-SIDE EFFLUENT

| Date | Relative Concentration | | | | | | | | | | | |
|---|---|---|---|---|---|---|---|---|---|---|---|---|
| | $Np^{239}$ | | $Cr^{51}$ | | $Zn^{65}$ | | $As^{76}$ | | $Cu^{64}$ | | $P^{32}$ | |
| | N | F | N | F | N | F | N | F | N | F | N | F |
| Sept.: | | | | | | | | | | | | |
| 14 a | 5.8 | 4.9 | 35.8 | 20.5 | 31.96 | 12.63 | 5.48 | 5.38 | 14.38 | 11.58 | 3.93 | 3.11 |
| 15 | 4.3 | 4.0 | 9.8 | 9.0 | 0.79 | 0.80 | 5.43 | 5.89 | 4.93 | 6.76 | 1.89 | 1.58 |
| 16 | 4.9 | 4.3 | 10.0 | 8.4 | 0.41 | 0.80 | 4.89 | 4.55 | 11.65 | 11.09 | 1.63 | 2.06 |
| 17 | 4.9 | 4.4 | 9.8 | 8.6 | 0.89 | 0.47 | 4.58 | 4.02 | 6.86 | 7.25 | 2.49 | 1.84 |
| 18 | 5.0 | 4.3 | 10.6 | 8.6 | 0.78 | 0.91 | 4.74 | 4.85 | 7.19 | 4.93 | 4.00 | 2.58 |
| 21 b | 3.0 | 3.7 | 7.3 | 8.5 | 0.98 | 3.68 | 2.99 | 3.98 | 4.51 | 4.72 | 2.44 | 2.53 |
| 22 c | 3.7 | 4.2 | 8.0 | 9.3 | 2.22 | 0.75 | 3.08 | 5.24 | 7.70 | 8.82 | 2.12 | 3.74 |
| 23 c | 5.1 | 4.5 | 15.9 | 9.1 | 3.14 | 1.16 | 6.51 | 5.25 | 11.33 | 7.83 | 10.85 | 3.20 |
| 24 | 4.1 | 5.0 | 9.9 | 9.9 | 1.05 | 1.24 | 3.55 | 4.55 | 4.65 | 5.06 | 2.87 | 4.05 |
| 25 c | 4.6 | 5.2 | 11.3 | 9.0 | 1.74 | .69 | 3.97 | 5.55 | 9.13 | 8.67 | | |
| 26 b | 4.1 | 5.3 | 9.0 | 9.3 | 0.91 | 6.71 | 1.59 | 7.30 | 7.99 | 8.63 | 3.94 | 3.40 |
| 27 b | 4.3 | 5.5 | 9.8 | 10.1 | 1.02 | 1.71 | 3.69 | 6.11 | 7.90 | 8.53 | 3.29 | 4.66 |
| 28 | 3.7 | 4.8 | 8.7 | 8.7 | 0.74 | 0.44 | 3.75 | 5.78 | 7.66 | 5.97 | 1.70 | 2.34 |
| 29 | 3.8 | 5.3 | 8.5 | 9.3 | 0.54 | 0.61 | 3.45 | 6.68 | 6.95 | 8.38 | 2.13 | 3.10 |
| 30 b | 4.1 | 6.3 | 10.4 | 25.1 | 0.80 | 10.23 | 3.38 | 7.33 | | | 2.20 | 2.45 |

See footnotes at end of table.

Table II—Continued

| Date | Np239 | | Cr51 | | Zn65 | | As76 | | Cu64 | | P32 | |
|---|---|---|---|---|---|---|---|---|---|---|---|---|
| | N | F | N | F | N | F | N | F | N | F | N | F |
| Oct.: | | | | | | | | | | | | |
| 1 c | 5.0 | 5.2 | 18.6 | 10.1 | 4.17 | 0.75 | 6.09 | 6.72 | | | 4.06 | 2.66 |
| 2 c | 4.4 | 5.1 | 14.1 | 12.1 | 2.57 | 1.35 | 4.26 | 17.71 | 8.11 | 7.08 | 4.24 | 2.64 |
| 3 | 4.2 | 5.4 | 10.2 | 9.7 | 1.00 | .93 | 4.39 | 7.71 | 7.03 | 8.08 | 2.26 | 2.96 |
| 4 a | 6.0 | 33.6 | 30.4 | 207.0 | 9.57 | 65.51 | 5.74 | 58.28 | 13.97 | 87.90 | 4.98 | 11.28 |
| 5 a | 7.3 | 2.4 | 67.6 | 6.1 | 17.48 | 2.66 | 5.24 | 1.19 | 5.28 | 16.80 | 5.90 | 5.75 |
| 13 b | 3.4 | 10.1 | 7.8 | 29.0 | 0.52 | 7.21 | 3.12 | 47.26 | | | 7.38 | 21.80 |
| 14 | 3.5 | 5.6 | 9.9 | 8.9 | 1.02 | 0.49 | 5.33 | 7.88 | | | 3.09 | 3.32 |
| 15 | 3.3 | 5.9 | 8.4 | 9.3 | 0.40 | 0.45 | 2.43 | 6.81 | | | 4.32 | 5.98 |
| 16 c | 7.3 | 6.3 | 26.5 | 10.1 | 7.40 | .80 | 8.15 | 5.67 | | | 1.68 | 2.87 |
| 25 | 2.5 | 5.4 | 7.6 | 10.4 | 0.32 | 0.29 | 2.45 | 8.65 | 5.24 | 7.25 | 1.50 | 2.80 |
| 26 | 2.5 | 6.0 | 7.6 | 10.3 | 0.30 | 0.79 | | | 5.98 | 8.38 | 1.15 | 2.72 |
| 27 | 3.1 | 6.3 | 7.5 | 10.0 | 0.24 | 0.35 | 2.56 | 8.42 | 6.11 | 9.59 | 1.53 | 2.91 |
| 28 | 3.2 | 6.4 | 7.3 | 10.0 | 0.32 | 0.37 | 2.79 | 8.52 | 5.80 | 8.26 | 1.49 | 3.17 |
| 31 | 3.1 | 6.5 | 7.4 | 11.0 | 0.33 | 0.40 | 3.84 | 8.32 | 6.56 | 8.60 | | |
| Nov.: | | | | | | | | | | | | |
| 1 | 3.2 | 6.5 | 7.9 | 10.4 | 0.31 | 0.39 | 2.66 | 9.08 | 6.61 | 9.72 | 1.58 | 3.33 |
| 2 | 3.1 | 6.8 | 7.8 | 10.5 | 0.37 | 0.45 | 2.75 | 8.92 | 6.21 | 9.28 | 1.54 | 3.28 |
| 3 a | 15.6 | 4.4 | 210.0 | 21.0 | 105.1 | 5.39 | 19.06 | 3.23 | 27.56 | 7.57 | 21.1 | 1.86 |
| 4 | 3.6 | 7.2 | 9.0 | 11.1 | 0.60 | .46 | 2.63 | 6.43 | 7.63 | 12.33 | 1.33 | 3.38 |
| 6 a | 61.4 | 3.9 | 18.1 | 11.4 | 3.12 | 2.68 | 12.75 | 4.15 | 7.80 | 11.41 | 5.88 | 5.09 |
| 9 | 2.6 | 5.4 | 6.9 | 9.3 | 0.30 | 0.46 | 2.11 | 6.19 | 3.52 | 6.15 | 1.90 | 2.52 |
| 10 | 2.8 | 6.1 | 7.7 | 9.5 | 0.61 | .66 | 2.55 | 8.81 | 5.11 | 8.42 | 1.78 | 2.60 |
| 11 | | | | | | | 2.22 | 5.32 | 5.97 | 9.20 | 1.51 | 3.42 |
| 12 | | | | | | | 2.44 | 8.02 | 6.06 | 9.29 | 1.45 | 3.38 |
| 14 | 3.0 | 7.1 | 8.1 | 10.4 | 0.40 | 0.49 | 2.80 | 8.01 | 6.56 | 10.59 | 1.86 | 3.37 |
| 17 b | | | | | | | 2.53 | 8.69 | 5.48 | 11.43 | 2.53 | 8.69 |
| 18 | 3.0 | 6.8 | 7.7 | 10.2 | 0.31 | 0.51 | 2.20 | 7.62 | | | 1.65 | 3.37 |
| 19 | 3.5 | 8.8 | 7.8 | 10.5 | 0.30 | 0.55 | 2.28 | 8.09 | 7.18 | 10.81 | 1.80 | 3.11 |
| 20 | 3.6 | 7.3 | 7.9 | 9.8 | 0.34 | 0.50 | 2.26 | 8.61 | 6.52 | 10.83 | 1.70 | 2.93 |
| 21 | 3.4 | 7.8 | 8.3 | 10.4 | 0.46 | 0.53 | | | 7.33 | 10.78 | | |
| 22 | 3.2 | 7.5 | 7.6 | 10.8 | 0.15 | 0.53 | 2.67 | 9.72 | 6.81 | 10.58 | 1.71 | 3.45 |
| 23 | 3.1 | 7.2 | 8.1 | 10.2 | 0.35 | 0.54 | 3.03 | 9.88 | | | 1.91 | 3.92 |
| 24 | 3.3 | 7.8 | 8.7 | 11.2 | 0.38 | 0.55 | 2.67 | 9.62 | | | | |
| 26 a | | | | | | | 2.80 | 10.05 | 7.26 | 10.80 | 2.02 | 5.40 |
| 28 | 3.4 | 8.7 | 9.3 | 11.0 | 0.93 | 0.82 | 3.29 | 11.67 | 8.17 | 11.70 | | |
| 30 | | | | | | | 2.80 | 9.30 | 6.42 | 8.92 | 1.74 | 3.67 |
| Dec.: | | | | | | | | | | | | |
| 5 a | | | | | | | 2.30 | 9.63 | 7.13 | 11.22 | 0.32 | 0.86 |
| 6 | 2.7 | 7.6 | 8.0 | 10.6 | 0.36 | 0.42 | 2.45 | 10.00 | 6.18 | 10.50 | 1.98 | 5.08 |
| 7 | 3.1 | 7.6 | 7.9 | 10.7 | 0.36 | 0.49 | 2.79 | 11.17 | | | 1.79 | 4.45 |
| 8 b | 3.0 | 8.1 | 9.1 | 10.4 | 0.55 | 2.65 | | | | | | | a Near and far side "cruddy."    b Far side cruddy.    c Near side cruddy.

In the case of the H reactor, ANN was used as the flocculant on the near side, beginning with 11 p.p.m. on September 16, and gradually increasing to 26 p.p.m. on September 21 and continuing at this level to November 4, when it was decreased to 20 p.p.m. and left at this level thereafter. During the time that 26 p.p.m. of ANN was added, the water treatment plant was operated on filter cycles of 13–20 hours; as predicted by the scale model tests breakthrough occurred from the filter during this period, resulting in "cruddy" samples and abnormal levels of radioisotopes due to particulate matter passing through the filter. Such breakthroughs occurred after 8–9 hours of filter operation. When the ANN was decreased to 20 p.p.m. on November 4 the filter cycle was reduced to 8 hours and 0.010 p.p.m. of Separan polyelectrolyte was added to the filter influent. During this test in the H reactor the pH of the water was maintained at 7.05 by addition of $H_2SO_4$ when needed.

Table III below is similar to Table II and gives the results relative to the H reactor.

Table III

RELATIVE RADIOISOTOPE CONCENTRATION IN H AREA, NEAR- AND FAR-SIDE EFFLUENT

| Date | Np239 | | Cr51 | | Zn65 | | As76 | | Cu64 | | P32 | |
|---|---|---|---|---|---|---|---|---|---|---|---|---|
| | N | F | N | F | N | F | N | F | N | F | N | F |
| Sept.: | | | | | | | | | | | | |
| 12 | 6.2 | 7.6 | 15.4 | 17.1 | 2.62 | 4.11 | 6.21 | 6.36 | 12.57 | 13.77 | 7.95 | 5.72 |
| 15 | 4.3 | 4.8 | 13.3 | 17.2 | 2.85 | 2.56 | 4.90 | 5.88 | 7.15 | 9.00 | 3.49 | 4.06 |
| 16 | 5.7 | 5.2 | 12.7 | 18.0 | 0.87 | 2.88 | 4.88 | 5.88 | 13.00 | 21.21 | 2.07 | 4.15 |
| 17 | 5.7 | 5.4 | 14.5 | 15.3 | 1.46 | 2.13 | 5.09 | 2.37 | 10.02 | 12.25 | 2.01 | 3.13 |
| 18 | 6.1 | 5.4 | 13.2 | 15.9 | 0.90 | 2.41 | 5.98 | 5.40 | 8.53 | 10.59 | 2.88 | 4.02 |
| 19 | 3.5 | 3.2 | 12.7 | 15.0 | 0.96 | 4.18 | 5.04 | 6.05 | 10.52 | 14.03 | 2.77 | 4.87 |
| 21 | 6.3 | 4.3 | 15.0 | 15.1 | 1.05 | 1.04 | 3.75 | 4.19 | 12.41 | 8.83 | 3.31 | 2.90 |
| 22 | 6.4 | 5.0 | 14.6 | 22.5 | 1.24 | 2.82 | 6.58 | 5.22 | 11.74 | 11.54 | 3.37 | 4.68 |
| 23 | 7.1 | 8.9 | 17.3 | 53.0 | 1.90 | 13.13 | 8.06 | 7.93 | | | 5.20 | 10.80 |
| 24 | 6.2 | 11.8 | 14.9 | 65.8 | 0.99 | 14.30 | 6.22 | 9.38 | 10.97 | 25.70 | 2.20 | 13.90 |
| 29 a | 11.0 | 9.7 | 56.8 | 73.9 | 13.63 | 21.45 | 14.18 | 10.47 | | | 11.40 | 12.78 |
| 30 | 7.3 | 7.8 | 20.5 | 57.9 | 13.79 | 16.26 | 6.85 | 6.33 | 16.50 | 33.07 | 4.59 | 9.14 |
| Oct.: | | | | | | | | | | | | |
| 1 | 7.7 | 4.5 | 25.6 | 24.8 | 4.78 | 5.40 | 7.86 | 2.64 | 14.09 | 12.16 | 3.03 | 5.82 |
| 2 | 9.3 | 4.8 | 27.9 | 14.8 | 5.03 | 1.82 | 11.41 | 4.29 | 34.38 | 20.16 | 4.01 | 3.53 |
| 3 | 6.9 | 3.4 | 16.6 | 14.5 | 1.72 | 1.18 | 6.58 | 2.92 | 16.51 | 11.55 | 3.82 | 2.98 |
| 4 | 8.4 | 5.2 | 29.5 | 32.9 | 6.05 | 6.54 | 8.27 | 4.57 | 13.79 | 12.60 | 1.47 | 4.59 |
| 5 | 11.6 | 8.7 | 66.6 | 76.2 | 15.20 | 18.80 | 13.79 | 6.85 | 25.05 | 19.33 | 5.47 | 10.17 |
| 6 | 8.5 | 6.9 | 30.8 | 44.3 | 5.58 | 10.49 | | | 15.00 | 17.00 | 3.48 | 5.42 |

See footnotes at end of table.

Table III—Continued

| Date | Np239 | | Cr51 | | Zn65 | | As76 | | Cu64 | | P32 | |
|---|---|---|---|---|---|---|---|---|---|---|---|---|
| | N | F | N | F | N | F | N | F | N | F | N | F |
| Oct.: | | | | | | | | | | | | |
| 7 | 6.8 | 4.3 | 14.5 | 16.5 | 1.70 | 1.93 | 7.36 | 2.84 | 18.32 | 13.10 | 1.48 | 3.83 |
| 8 | 7.7 | 5.9 | 17.7 | 26.9 | 2.00 | 5.01 | 6.37 | 3.90 | 14.81 | 13.90 | 2.69 | 5.55 |
| 9 | 16.1 | 3.5 | 44.9 | 14.2 | 6.57 | 2.19 | 8.25 | 3.15 | 14.19 | 7.04 | 2.31 | 4.05 |
| 18 | 13.6 | 9.5 | 26.1 | 7.6 | 41.63 | 1.74 | 10.13 | 1.47 | 5.57 | 7.30 | 18.12 | 3.69 |
| 19 | 5.3 | 3.2 | 12.0 | 14.8 | 1.53 | 3.81 | 5.87 | 3.14 | 12.34 | 13.01 | 2.34 | 2.58 |
| 20 | 5.1 | 2.5 | 5.9 | 9.9 | 1.21 | 0.52 | 3.53 | 1.74 | | | 0.75 | 1.30 |
| 21 | 6.1 | 2.2 | 11.3 | 7.6 | 1.77 | 0.82 | 4.21 | 1.35 | | | 2.58 | 1.00 |
| 24 | 3.8 | 6.6 | 6.2 | 6.5 | 2.30 | 0.80 | 2.94 | 1.65 | 7.35 | 4.61 | 1.62 | 1.78 |
| 25 | 4.3 | 41.4 | 6.8 | 42.9 | 0.52 | 11.52 | 3.65 | 8.65 | 6.58 | 15.69 | 1.80 | 8.82 |
| 26 | 4.5 | 2.5 | 7.5 | 6.4 | 0.56 | 0.45 | 3.54 | 1.50 | 8.10 | 4.91 | 1.49 | 1.42 |
| 27 | 2.2 | 4.6 | 6.7 | 7.7 | 0.41 | 0.48 | | | 3.57 | 6.44 | 2.19 | 1.48 |
| 28 | 5.7 | 2.3 | 11.3 | 6.9 | 1.75 | 0.33 | 3.84 | 1.41 | 9.80 | 5.03 | 0.96 | 1.13 |
| 29 | 5.6 | 3.4 | 9.2 | 9.1 | 0.48 | 1.30 | 4.11 | 1.76 | 9.25 | 5.24 | 1.39 | 1.24 |
| 31 b | 7.0 | 8.8 | 14.1 | 47.0 | 1.80 | 22.1 | 5.85 | 5.20 | 10.99 | 42.25 | 1.79 | 1.09 |
| Nov.: | | | | | | | | | | | | |
| 1 | 7.2 | 2.2 | 16.1 | 8.2 | 1.68 | 0.67 | 8.83 | 2.55 | 11.80 | 5.26 | 1.88 | 0.89 |
| 2 b | 7.2 | 10.8 | 15.8 | 47.8 | 1.87 | 33.5 | 6.82 | 3.54 | 9.73 | 19.70 | 2.08 | 4.07 |
| 3 c | 8.5 | 4.5 | 20.4 | 15.0 | 3.14 | 7.96 | 7.37 | 6.77 | 8.89 | 9.28 | 28.66 | 1.87 |
| 4 b | 8.5 | 7.2 | 15.1 | 20.7 | 0.99 | 16.2 | 7.29 | 7.25 | 12.21 | 22.55 | 2.79 | 4.46 |
| 5 b | 9.6 | 4.0 | 18.2 | 22.8 | 2.94 | 12.2 | 8.68 | 3.47 | 12.77 | 10.36 | 2.72 | 6.29 |
| 6 d | 11.9 | 3.3 | 32.7 | 13.1 | 20.7 | 1.88 | 11.46 | 19.52 | 21.79 | 8.61 | 3.98 | 3.55 |
| 12 | | | | | | | 7.23 | 1.66 | 9.93 | 5.75 | 2.64 | 1.46 |
| 15 d | | | | | | | 9.82 | 3.26 | | | 21.9 | 3.52 |
| 16 | | | | | | | 8.49 | 3.00 | 11.79 | 10.90 | 6.47 | 3.08 |
| 17 | 8.4 | 3.2 | 12.9 | 10.7 | 1.00 | 0.87 | 8.97 | 2.54 | 12.48 | 7.30 | 3.47 | 1.99 |
| 18 | 8.7 | 2.9 | 11.8 | 8.7 | 0.69 | 0.54 | 9.57 | 2.50 | | | 6.03 | 1.84 |
| 21 | 7.2 | 2.7 | 9.8 | 8.7 | 0.66 | 0.50 | 7.75 | 1.94 | 10.40 | 7.01 | 2.50 | 1.47 |
| 22 | 9.1 | 2.9 | 12.7 | 9.8 | 0.61 | 0.65 | 10.90 | 2.41 | | | | |
| 23 b | | | | | | | 10.50 | 132.9 | | | | |
| 24 | 10.5 | 2.8 | 15.6 | 9.4 | 1.35 | 0.56 | 9.52 | 1.80 | | | 3.48 | 0.40 |
| 25 | 10.3 | 3.1 | 13.2 | 9.3 | 0.77 | 0.67 | 9.60 | 1.95 | | | 3.20 | 0.39 |
| 26 e | 11.3 | 3.4 | 13.8 | 10.1 | 1.01 | 0.64 | 4.31 | 1.99 | 13.54 | 7.27 | 4.15 | 0.46 |
| 27 | | | | | | | | | | | | |
| Dec.: | | | | | | | | | | | | |
| 4 c | | | | | | | 23.60 | 5.59 | 29.90 | 12.10 | 11.2 | 1.54 |
| 5 c | | | | | | | 11.04 | 2.64 | 14.79 | 9.75 | 3.62 | 1.23 |
| 8 | 15.4 | 4.6 | 14.1 | 9.5 | 0.93 | 0.86 | 12.37 | 2.70 | 14.35 | 8.56 | 6.65 | 0.03 |
| 9 | 11.6 | 3.3 | 16.9 | 10.3 | 0.86 | 0.74 | | | | | 1.74 | 0.13 |
| 10 d | | | | | | | | | | | 0.76 | 0.19 |
| 11 d | | | | | | | | | | | 0.76 | 0.24 |
| 12 | 12.9 | 3.3 | 16.6 | 10.5 | 2.41 | 1.08 | | | | | 2.68 | 0.34 |
| 13 | 12.5 | 3.3 | 20.5 | 11.7 | 3.46 | 0.94 | 13.53 | 2.60 | 13.87 | 10.82 | 2.64 | 0.25 |
| 14 c | | | | | | | 15.33 | 4.28 | 21.90 | 16.87 | 3.85 | 2.82 |
| 15 | 12.5 | 3.4 | 15.8 | 11.7 | 1.50 | 1.20 | 14.08 | 3.47 | | | 2.11 | 0.69 |
| 16 | 10.1 | 3.1 | 13.5 | 10.3 | 0.90 | 0.82 | 11.80 | 2.62 | | | 4.09 | 0.29 |
| 17 | 18.0 | 4.8 | 14.6 | 9.7 | 1.20 | 0.74 | 14.64 | 2.56 | | | | |
| 18 d | 16.7 | 4.5 | 17.1 | 10.0 | 3.87 | 0.86 | 13.22 | 2.50 | | | | |
| 19 | 15.8 | 4.2 | 19.4 | 10.1 | 1.77 | 0.90 | 15.31 | 2.93 | | | | |
| 20 | 17.9 | 5.0 | 16.0 | 10.4 | 1.14 | 0.93 | 16.25 | 2.75 | 17.10 | 10.38 | | | a Results not typical owing to filter breakthrough: Sept. 12–Oct. 28.
b Far side cruddy.
c Near and far side cruddy.
d Near side cruddy.
e From Nov. 27 to Dec. 3, all samples were cruddy.

The data presented in Tables II and III are summarized below in Table IV. In making up this table, the data of the cruddy samples were purposely ignored since they represent an abnormal condition that the experiments have proved can be avoided by reducing the amount of flocculant, increasing the polyelectrolyte injection into the filter influent, shortening the filter cycle of backwashing, or a combination thereof.

Table IV

AVERAGE REDUCTION IN RADIOISOTOPE CONCENTRATION

| Isotope | Reduction—Percent | |
|---|---|---|
| | B | H |
| P32 | [1] 52(63) | 77 |
| As76 | 72 | 76 |
| Zn65 | 33 | 30 |
| Cu64 | 36 | 33 |
| Np239 | 58 | 71 |
| Cr51 | 24 | 31 |

[1] Obtained between Nov. 28 and Dec. 7.

Table IV actually underrates the results of applying the principles of the invention to the reactors in question because mixing took place between the near and far sides of the reactors. It is believed that such mixing amounts to about 10 percent, and assuming this to be correct, the following Table V gives an adjusted summary of the summary of Table IV.

Table V

CALCULATED REDUCTIONS IN RADIOISOTOPE CONCENTRATIONS [1]

| Isotope | Reduction—Percent | |
|---|---|---|
| | B | H |
| P32 | [2] 61(73) | 88 |
| As76 | 82 | 87 |
| Zn65 | 40 | 36 |
| Cu64 | 43 | 40 |
| Np239 | 68 | 81 |
| Cr51 | 24 | 31 |

[1] Assuming 10 percent mixing.
[2] Obtained between Nov. 28 and Dec. 7.

It will be understood that the invention is not to be limited to the details given herein but that it may be modified within the scope of the appended claims.

The embodiments of the invention in which an exclusive property or privilege is claimed are defined as follows:

1. In the operation of a nuclear reactor having aluminum base alloy coolant channels and a supply of incoming coolant water having a particulate solids content of from zero to 10 p.p.m., a pH of about 7 and containing dissolved precursors of radioactive isotopes, wherein the said coolant water is led through the said coolant channels within the core of the reactor and discharged outside the reactor, the improvement comprising adding to the incoming coolant water from about 10 to about 20 parts per million of a hydrolyzable aluminum compound which on hydrolysis, gives an hydrolysate floc, and separating the floc from the incoming coolant water.

2. The method of claim 1 where the dissolved precursors of radioactive species are members of the class consisting of $P^{31}$, $S^{32}$, $As^{75}$, $Zn^{64}$, $U^{235}$ and $U^{238}$.

3. The method of claim 1 where the aluminum compound is selected from the class consisting of alum, aluminum sulfate and aluminum nitrate.

4. The method of claim 1 where the aluminum compound is aluminum nitrate.

5. The method of claim 1 where the coolant water has a pH of from about 6.5 to about 7.3 and the aluminum compound is added to the incoming coolant water in the proportions of about 20 parts per million parts of water.

6. The method of claim 5 where the aluminum compound is aluminum nitrate.

7. The method of claim 5 where the aluminum compound is aluminum sulfate.

8. The method of claim 5 where the aluminum compound is alum.

9. The method of operating a nuclear reactor having aluminum base alloy coolant channels and a supply of incoming coolant water having a particulate solids content of zero to 10 p.p.m., a pH of about 7 and containing dissolved precursors of radioactive isotopes, which comprises adding to said coolant water, in a substantially greater amount than sufficient to remove particulate matter, a hydrolyzable aluminum compound which, on hydrolysis, gives an hydrolysate floc, separating the water from the resulting floc, injecting the water with about 0.02 p.p.m. of a polyelectrolyte filter aid material, passing the mixture through a filter having a layer of broken-up coal of about 0.7 to about 0.8 particle size and below it a layer of sand of about 0.3 to about 0.4 particle size, the said layer of coal being from four to nine times as thick as said layer of sand, and passing the filtered water through said coolant channels within the core of the reactor and discharging it outside the reactor.

10. The process of claim 9 wherein the hydrolyzable aluminum compound is added to the coolant water in an amount above approximately 20 p.p.m.

References Cited in the file of this patent

UNITED STATES PATENTS 2,907,689     Kidder et al. _____ Oct. 6, 1959